July 1, 1941.  C. J. WEBSTER, JR  2,247,423
ELASTIC FLUID TURBINE DIAPHRAGM SUPPORTING AND CENTERING ARRANGEMENT
Filed Jan. 25, 1940
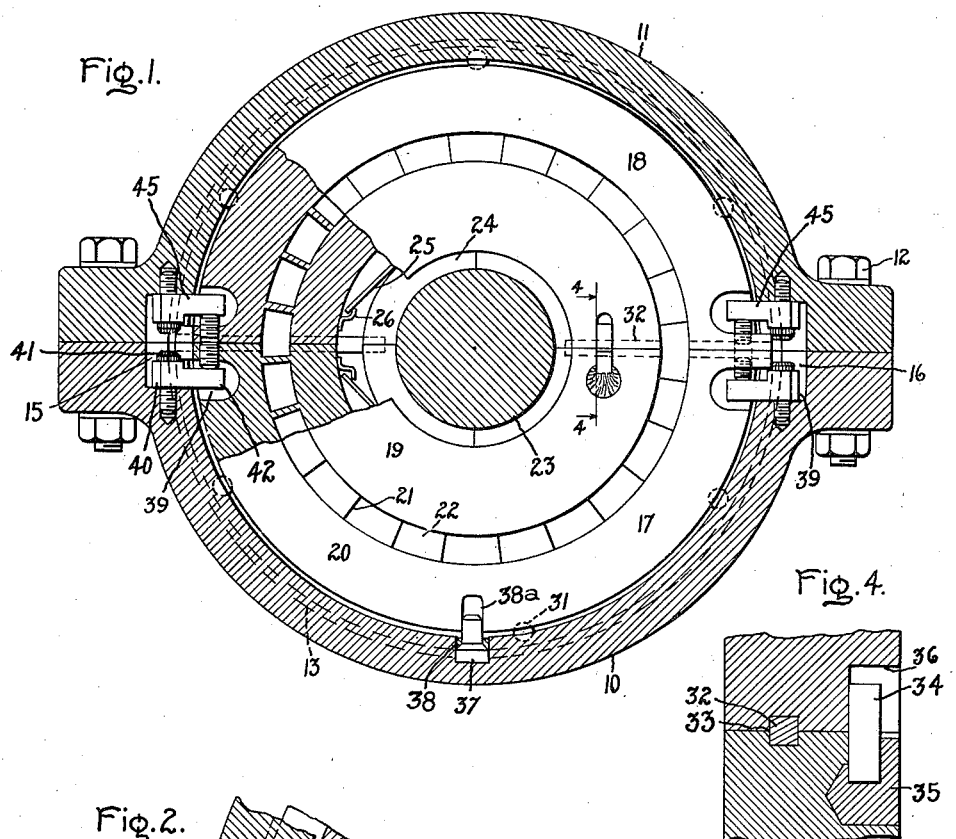
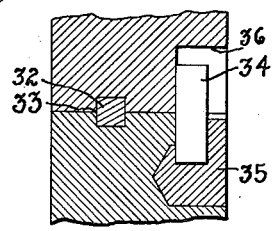
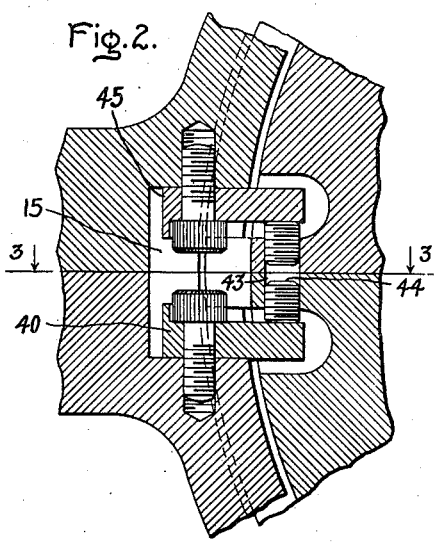
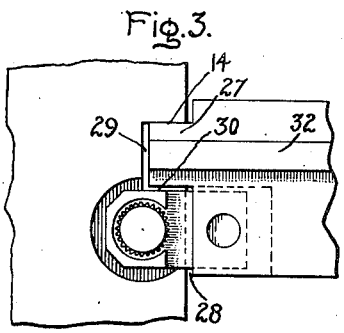
Inventor:
Carroll J. Webster Jr.,
by Harry E. Dunham
His Attorney.

Patented July 1, 1941

2,247,423

UNITED STATES PATENT OFFICE 2,247,423

ELASTIC FLUID TURBINE DIAPHRAGM SUPPORTING AND CENTERING ARRANGEMENT

Carroll J. Webster, Jr., Beverly, Mass., assignor to General Electric Company, a corporation of New York Application January 25, 1940, Serial No. 315,547

4 Claims. (Cl. 253—78)

The present invention relates to elastic fluid turbine diaphragm supporting and centering arrangements. More specifically the invention relates to the kind of arrangements in which both the turbine casing and the diaphragm or diaphragms for conducting elastic fluid to bucket wheels are made of two halves joined together in a horizontal plane through the axis of rotation of the turbine rotor although it is not limited thereto necessarily. Splitting into halves of the casing and the diaphragms facilitates assembling and dismantling of the turbine. In order to assure proper cooperation between an annular row of nozzles formed by the diaphragm and an annular row of buckets on a bucket wheel it is necessary that the diaphragm be properly supported and centered on the casing. An arrangement of this kind is broadly disclosed and covered by the copending application of Johnson and Wadden, Serial No. 315,548, filed on the same date and assigned to the same assignee as the present application.

The object of my invention is to provide an improved construction and arrangement whereby a turbine diaphragm may be readily supported and centered on a turbine casing.

For a consideration of what I believe to be novel and my invention, attention is directed to the following description and the claims appended thereto in connection with the accompanying drawing.

In the drawing Fig. 1 illustrates a sectional view of a turbine embodying my invention; Fig. 2 is an enlarged detail view of a part of Fig. 1; Fig. 3 is a section along line 3—3 of Fig. 2; and Fig. 4 is an enlarged section along line 4—4 of Fig. 1.

The arrangement comprises a turbine casing having flanged lower and upper halves 10 and 11 respectively with flanged portions joined along a horizontal plane through the axis of rotation and secured together by bolts 12. The casing has an annular groove 13 forming a shoulder 14. Diametrically opposite parts of the flanged casing portions form recesses 15 and 16 respectively. A diaphragm having lower and upper halves 17 and 18 respectively is disposed within the casing. The diaphragm as a whole is composed of an inner disk 19, an outer ring 20 and a plurality of partitions or blades 21 having ends secured to the disk 19 and the ring 20 respectively to form an annular row of nozzles 22 for conducting elastic fluid to a turbine wheel (not shown) carried on a shaft 23. A sealing arrangement is provided between the shaft 23 and the disk 19 of the diaphragm to reduce leakage of elastic fluid along the shaft 23. The sealing arrangement is of known construction and comprises a ring 24 having a plurality of segments surrounding the shaft 23 and held in archbound relation by means of flat springs 25 engaging the segments and having ends held on lugs 26 suitably supported in an annular recess of the disk 19. An outer portion of the diaphragm ring 17 forms an annular projection 27 projecting into the annular groove 13 in the casing and engaging the shoulder 14 formed by the groove 13 on the casing. The axial flow of steam forces the diaphragm into engagement with the shoulder 14 and thereby prevents leakage of fluid along the inner surface of the casing. During operation the diaphragm may expand more than the casing. In order to permit relative radial expansion between the diaphragm and the casing the two form radial clearances 28 and 29. They also form an axial clearance 30 between the annular projection 27 and the casing wall opposite the shoulder 14. A plurality of axial crush pins 31 secured to the diaphragm and engaging the casing prevent excessive relative movement of the diaphragm during shipping and operation. Relative axial movement between the two diaphragm halves is prevented by radial keys 32 secured to the lower diaphragm half and projecting into grooves 33 in the upper diaphragm half. The diaphragm halves are prevented from moving laterally relative to each other by means of a vertical key 34 secured in a groove in the face of the lower diaphragm half 17 by a weld 35 and slidably projecting into a groove 36 in the face of the upper diaphragm half 18.

The lower diaphragm half 17 in the present example is centered horizontally in the lower casing half 10 by a vertical pin 37 secured in a groove 38 in the bottom portion of the lower casing half 10 and slidably projecting into a vertical bore 38a in the lower diaphragm half 17. The pin maintains the lower diaphragm half in a position in which its upper face, that is, the dividing plane of the two halves, is parallel to the joint or dividing plane between the casing halves. Proper centering of the diaphragm requires that its center coincide with the center or axis of the casing and in the present example that the face of the lower half be located in a plane through the joint of the casing halves. With the centers of the casing and the diaphragm located in the planes through the respective joints thereof, the joint of the diaphragm halves and the joint of the casing halves should be located in the same plane. This is accomplished by properly vertically centering the diaphragm halves by means of lug arrangements on opposite sides of the diaphragm. More specifically, the lower diaphragm half 17 is centered vertically by a lug arrangement 39 on each side of the diaphragm. Each of the lug arrangements comprises a lug 40 secured in the recess 15 of the lower casing half 10 by a bolt 41 and having a portion projecting into a recess 42 in the lower diaphragm half 17. The diaphragm member is supported on the lug member by adjustable means. In the present instance the lower diaphragm half has a vertical screw-threaded bore 43 communicating with the recess 42. A pin or screw 44 is screwed into the bore 43 and engages the lug 40. Positioning of the pins 44 on opposite sides of the lower diaphragm half permits raising and lowering of the latter on the lower casing half. During assembly the pins 44 are so adjusted that in the present example the face of the lower diaphragm half 17 and the face of the lower casing half 16 are at the same level, that is, in the same plane. During assembly the lower diaphragm half is placed into the lower casing half. The lugs 40 are then inserted into the recesses 42 and secured to the casing by the bolts 41 whereupon the pins 44 are adjusted.

The upper diaphragm half 18 is centered vertically in the upper casing half 11 prior to assembly of the two casing halves by means including a lug arrangement 45 on each side of the upper diaphragm half. The lug arrangements 45 are similar to those described above in connection with the vertical centering of the lower diaphragm half. The lugs 40 for centering the upper diaphragm half on the upper casing prior to assembly of the turbine casing halves act as supports for the upper diaphragm half 18 on the upper casing half 11. Subsequent to the assembly of the two casing halves the lugs 45 for the upper diaphragm halves no longer support the upper diaphragm half but they prevent the upper diaphragm half from moving upward. They still act as a vertical centering means for the upper diaphragm half, the latter then being supported directly on the lower diaphragm half, and indirectly on the lugs 40 supporting the lower diaphragm half 17 on the lower casing half 10.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. Elastic fluid turbine diaphragm supporting and centering arrangement including a turbine casing comprising upper and lower halves flanged together, a diaphragm member disposed within the casing, and means for normally supporting and centering the diaphragm member on the casing after assembly therewith, said means comprising a lug member secured to the casing means adjustably secured to one of the members and normally engaging the other member, and a single dowel pin between the casing and the diaphragm member, and circumferentially spaced about 90 angular degrees from the lug member.

2. Elastic fluid turbine diaphragm supporting and centering arrangement including a turbine casing comprising upper and lower halves flanged together, a diaphragm disposed within the casing, and means for normally supporting and centering the diaphragm on the casing after assembly hterewith, said means comprising circumferentially spaced lug arrangements, each lug arrangement including a lug fastened to the casing and a screw secured to the diaphragm and supported on the lug, and a dowel pin secured to the casing and slidably projecting into a radial opening of the diaphragm.

3. Elastic fluid turbine diaphragm supporting and centering arrangement comprising a casing having lower and upper halves, a diaphragm having lower and upper halves disposed in the casing, means preventing relative axial and sidewise movement between the diaphragm halves, and means supporting and centering the diaphragm in the casing, said means comprising a vertical dowel pin secured to the lower casing half for horizontally centering the lower diaphragm half in the lower casing half, a lug arrangement on each side of the lower diaphragm half, each lug arrangement including a lug bolted to the casing and projecting into a recess in the diaphragm and an adjustable screw secured to the diaphragm and engaging the lug, and other lug arrangements on each side of the upper diaphragm half to limit vertical movement of the latter.

4. Elastic fluid turbine diaphragm supporting and centering arrangement comprising a turbine casing having lower and upper halves joined together and forming an annular groove and a recess near their joint, a diaphragm having lower and upper halves having an annular projection located in the groove and having a recess on each side of each half, and separate means on each side for centering the diaphragm in the casing, said means comprising a member held in the casing recess and projecting into the diaphragm recess and an adjustable pin between the member and the diaphragm.

CARROLL J. WEBSTER, Jr.